United States Patent [19]
Swope et al.

[11] 3,877,894
[45] Apr. 15, 1975

[54] GAS CHROMATOGRAPH COLUMN MATERIAL

[75] Inventors: Lawrence G. Swope, Chillicothe; Emory A. Smith, Portsmouth, both of Ohio

[73] Assignee: The United States of America as represented by the United States Atomic Energy Commission, Washington, D.C.

[22] Filed: Jan. 18, 1974

[21] Appl. No.: 434,725

[52] U.S. Cl. ........................................ 55/67; 55/386
[51] Int. Cl. ............................................. B01d 15/08
[58] Field of Search............. 55/67, 386; 210/198 C

[56] References Cited
UNITED STATES PATENTS

| | | | |
|---|---|---|---|
| 3,295,296 | 1/1967 | Halasz et al. | 55/386 X |
| 3,340,085 | 9/1967 | Halasz et al. | 55/386 X |

*Primary Examiner*—John Adee
*Attorney, Agent, or Firm*—John A. Horan; David S. Zachry; John B. Hardaway

[57] ABSTRACT

An improved apparatus and process for gas chromotography using fluorinated graphite as a column-packing material are described.

8 Claims, 5 Drawing Figures

GAS CHROMATOGRAPH COLUMN MATERIAL

BACKGROUND OF THE INVENTION

This invention was made in the course of, or under, a contract with the United States Atomic Energy Commission. It relates generally to the art of gas chromatography.

During the past 20 years, gas chromatography has developed into a powerful tool for gas separation and gas analysis. An apparatus for carrying out gas chromatography comprises at the bare bones level, as is depicted in FIG. 1, a means 1 for feeding gases to a column 2 containing a packing 3 and means for detecting the outflow of gases 4. The feeding means 1 is normally a valve through which a carrier gas passes and into which a sample can be injected by means of an injection valve or a syringe. The column 2 is a hollow plastic, metal, or glass tube. The detector is a thermal conductivity device or ionization gauge or any other means which can differentiate between various gases and give an output which is indicative of the difference and amount. The output normally displayed on a recorder.

The principle of operation is generally that various gases are temporarily sorbed onto the packing material 3 and desorbed after a period of time. The length of time before desorption is determined by the chemical and/or physical interaction between the packing material and the sorbed gases. Thus, different gases are sorbed for different periods of time and separation is achieved thereby.

Several different packing materials have been routinely used in gas chromatography. The most prominent materials are high-molecular-weight polymers of chlorotrifluoroethylene, diatomaceous earth, molecular sieves, silica gel, and polytetrafluoroethylene. When the column is operated with just the solid packing material in the column, the process is referred to as gas-solid chromatography (GSC). Frequently, a solid packing material is coated with a liquid so that the gases interact with the liquid coating. Liquid coatings which have been generally used are low-molecular-weight polymers of chlorotrifluoroethylene and fluorocarbon oils such as the perfluoroalkanes. When such a liquid coating is used, the process is referred to as gas-liquid chromatography (GLC), and the solid packing is referred to as a solid support.

Gas chromatographic analysis of reactive fluoride gases, and halocarbons in the presence of reactive fluorides, has long been of interest to researchers in the atomic energy field. Previous investigations in this area have included both gas-liquid and gassolid chromatography methods, but these attempts have not solved such basic analytical problems as the direct determination of $F_2$ in the presence of mixtures containing $N_2$ or $N_2$ and $ClF_3$. These analyses have traditionally been performed by various methods such as wet chemistry or infrared spectroscopy (IRS). Wet chemical methods, however, are often nonspecific and subject to interferences (e.g., $F_2$ and $ClF_3$ cannot be distinguished by wet chemistry alone). IRS, while very specific in identifying compounds, is subject to analytical uncertainties if too many IR active compounds are present in a sample (e.g., $ClF$ and $ClF_3$). Also, IRS cannot detecct diatomic homonuclear molecules such as $F_2$, $O_2$, or $N_2$. A gas chromatography method for indirect $F_2$ determination has been used with limited success. The technique involves reacting $F_2$ with $NaCl$ to yield $Cl_2$, which can be analyzed by a gas chromatograph. However, this procedure entails complex column switching, and yields large quantitative uncertainties, so it is not generally acceptable for precise analytical work.

Any solid considered for corrosive halide GSC must possess the following properties:

1. Be inert to corrosive gasses of interest such as $F_2$ and $ClF_3$.
2. Have a regular shape (ideally spherical) for uniformity of column packing.
3. Have a high crush strength to maintain integrity during packing and handling.
4. have a large surface area ($>100$ m$^2$/g).
5. Maintain its mechanical integrity at temperatures low enough to separate $F_2$ from air (possibly as low as $-150°C$).
6. Withstand operating temperatures as high as $+200°C$ for efficient elution of highly retained compounds such as $ClF_3$ or HF.
7. Have a pore structure which will permit efficient separation of compounds of interest.
8. Absorb and desorb all compounds of interest within the column operating temperature range.

Characteristics 2, 3, 4, 7, and 8 are requirements for any GSC material, whereas 1, 5, and 6 are specific for working with corrosive inorganic fluorides. Requirements 7 and 8 are generally determined by actually packing and testing a column.

If the pore structure is correct, component peaks will be sharp and well separated, allowing accurate quantitative analysis. Requirement 8 will be met if no component in a mixture is permenently sorbed on the column. This prevents column poisoning by a particular compound. For example, NaF would not be a good column material for use with HF or $SiF_4$ at low temperatures, because their permanent sorption on the NaF will eventually degrade column performance.

While temperature programmable chromatographs capable of operating at cryogenic temperatures are commercially available and utilized for noncorrosive applications, previous corrosive gas chromatography instruments have been operated only isothermally above ambient temperatures in order to keep the equipment simple and ruggeed, and to maintain reasonable analysis times. These operating conditions have severely limited the versatility of these instruments in the analysis of complex corrosive fluoride gas mixtures. In addition, column technology in this field has only recently been extended into the area of gas-solid chromatography on a very limited basis. Corrosive fluoride gas chromatography has generally lagged behind the state-of-the-art of the conventional chromatography.

SUMMARY OF THE INVENTION

It is thus an object of this invention to provide a new column-packing material for use in gas chromatography.

It is a further object of this invention to provide a packing material for use in both gas-liquid and gas-solid chromatography.

It is a particular object of this invention to provide a gas chromatography packing material which is resistant to reactive fluoride gases and mixtures of fluorides, chlorides, and halocarbons.

These as well as other objects are accomplished by using fluorinated graphite as a column material in gas chromatography.

DETAILED DESCRIPTION

According to this invention, it has been found that fluorinated graphite has all of the attributes of a gas chromatography packing material as well as being resistant to reactive fluorides and other halogenated materials.

As used within this disclosure the term "fluorinated graphite" means $(CF_x)_n$ where $0.5 < x < 1.14$ and $n$ is an integer. Fluorinated graphite is the result of the direct combination of fluorine with atoms of carbon which are already arrayed in a graphite crystal structure. The resulting material retains certain properties of the graphite, such as relative chemical inertness and the general layered planar crystal structure, while assuming new properties, such as high surface area and low density. Fluorinated graphite is a member of the fluorocarbon family of chemicals, differing from other members of this class, such as polytetrafluoroethylene, in that it has only fluorine and carbon atoms in ratios of about 1 or less, and possesses physical properties, such as crystal structure, unlike any other fluorocarbon. Polytetrafluoroethylene, for axample, is the result of polymerization of tetrafluoroethylene with the resulting product containing 2 atoms of fluorine for each carbon atom. It possesses a low degree of crystallinity, with very little tendency toward strong orientation of the crystals such as is found in fluorinated graphite.

Particles of fluorinated graphite for use in gas chromatography are not commercially available in a desirable size range. Commercially available fluorinated graphite is designed for use as a lubricant and is thus available in sizes too small (less than 10 microns) for practical gas chromatography applications. The optimum particle size used for a column-packing material involves a trade-off between factors affecting operatonal efficiencies. The need to reduce the random diffusion of molecules in the column (and thereby deecrease peak broadening) and to increase the packing density (to use shorter columns) requires the smallest particles possible be used. However, in order to reduce the pressure drop across the column and hence maintain uniform carrier velocity and to obtain a regular packing arrangement in the column, a larger particle size is desirable. To accomplish these trade-offs, ¼ inches-O.D. GC columns are packed with particles in the range of 177 to 420 microns (80 to 40 mesh), and ⅛ inch-O.D. columns with particles in the range of 125 to 177 microns (120 to 80 mesh).

Figure 1:
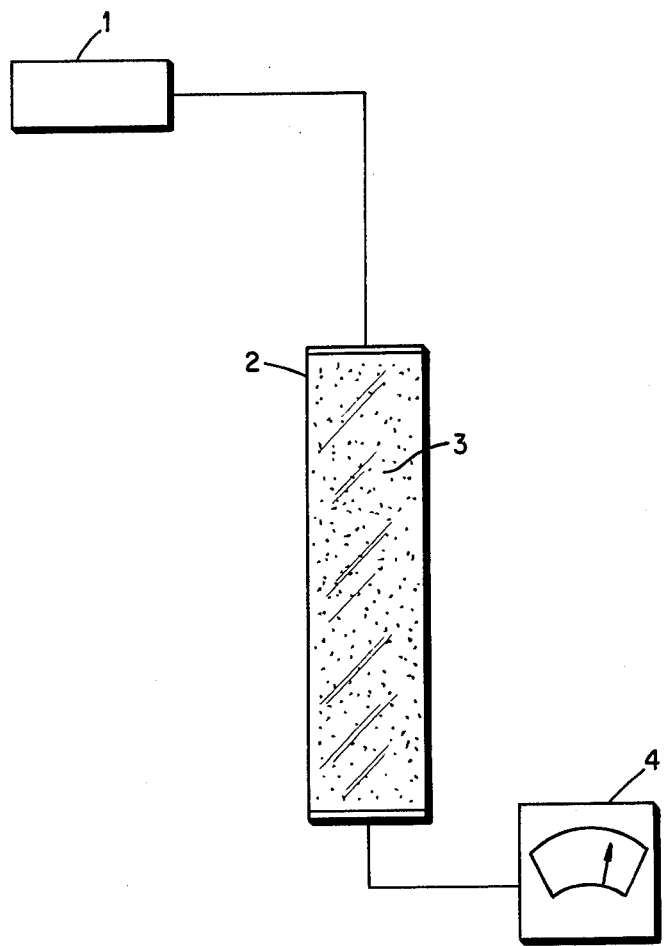
FIG. 1 schematically illustrates an apparatus for use in gas chromatography.
Figure 2:
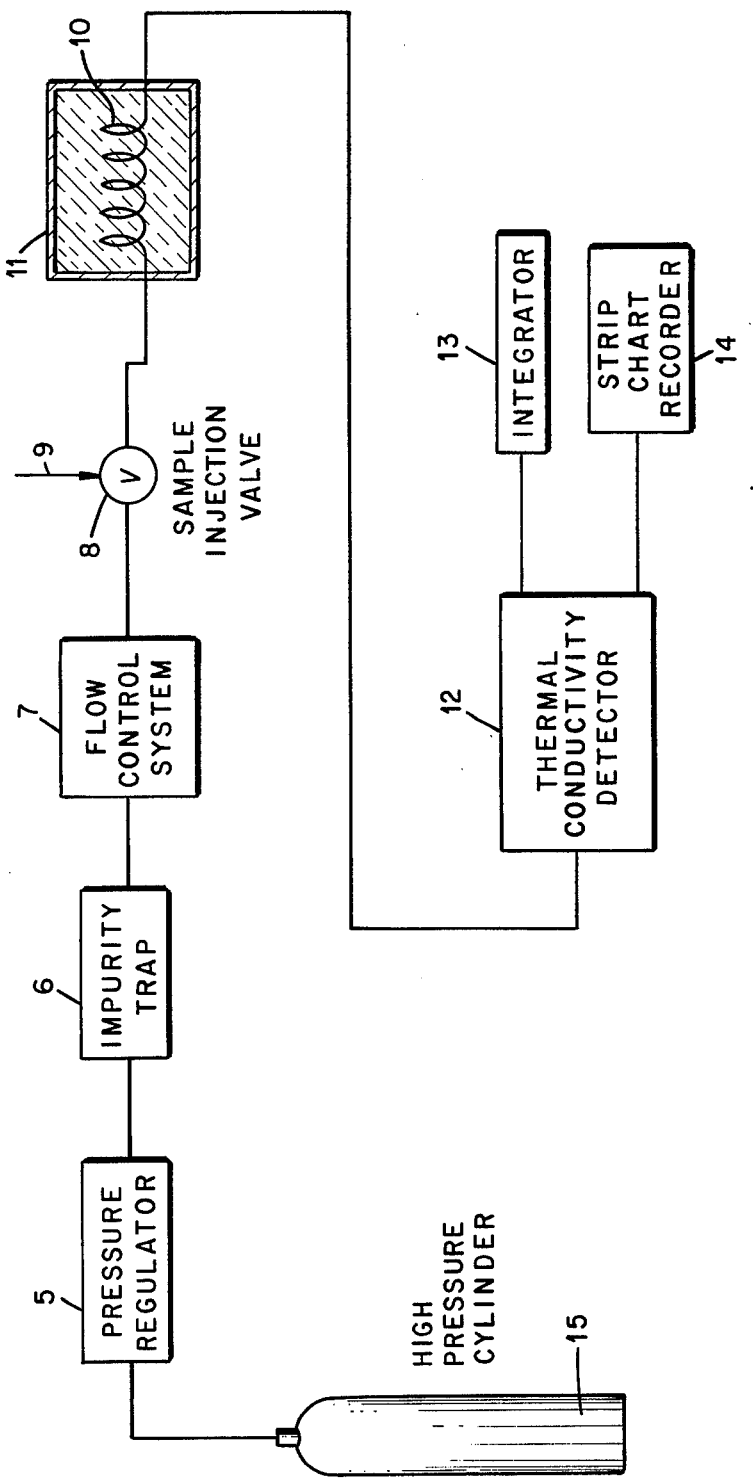
FIG. 2 schematically illustrates a preferred apparatus in accordance with this invention.

While a bare-bones-level apparatus is shown in FIG. 1 and described above, a preferred arrangement for use in corrosivee halide chromatography is illustrated in FIG. 2. This is a conventional commercial unit which is modified for corrosive applications and which utilizes the novel packing material of this invention. The apparatus comprises a high pressure cylinder 15 for the carrier gas, preferably helium, a pressure regulator 5, an impurity trap 6, a flow control system 7, and a gas injection valve 8. The sample is supplied to injection valve 8 through a nickel transfer system 9. Valve 8 is fabricated from nickel and polytetrafluoroethylene for corrosive application. Nickel column 10 which contains the fluorinated graphite is connected to valve 8 by means of nickel tubing. Column 10 is housed in a temperature controlled environment 11 which is controllable from $-170°$ to $400$ °C. Nickel tubing connects the column 10 with thermal conductivity detector 12 which comprises four gold-supported nickel elements mounted in aluminum oxide. The output of detector 12 is fed to electronic integrator 13 and strip chart recorder 14. This electronic integrator 13 and strip chart recorder 14. This apparatus arrangement was used in Examples II–V which follow.

Having generally described the invention, the following specific examples are given to more particularly describe the preparation and use of fluorinated graphite as GC column packing.

EXAMPLE I

Nine hundred grams of 0–200 mesh (ASTM) SP-1 grade (National Carbon) graphite (a spectroscopic grade of graphite containing less than 1 ppm impurities) was sieved to obtain approximately 20–30 grams of 80/120 mesh material for direct fluorination. The procedure used to fluorinate the graphite was as follows:

1. A thin layer of graphite (about 2 mm) was placed in a nickel boat, and sealed in a nickel reactor.
2. The reactor was evacuated and heated to 200 °C.
3. One-half atmosphere of $F_2$ was added, and kept in the reactor for one-half hour for conditioning purposes.
4. The $F_2$ was evacuated and the temperature raised to approximately 425°C. 5. One-half atmosphere $F_2$ was placed in the reactor for 24 hours, with periodic additons of $F_2$ to maintain the pressure at one-half atmosphere as the reaction proceeded.

Material produced by this process possessed the following characteristics which include the first six requirements listed previously for a GSC packing for use with corrosive fluorides:

a. Inert to $ClF_3$, $F_2$, and HF at temperatures of at least 200°C.

b. Fairly regular spheroidal shape.

c. A high crush strength and does not deteriorate during vigorous handling.

d. Surface area greater than 130 m²/gram.

e. Maintains its mechanical integrity at least within the temperature range between $-170$°C and $+300$°C.

f. Average pore radius of 17 A.

g. Carbon:fluorine ratio of about 1:0.6; e.g., $(CF_{0.6})_n$.

To demonstrate the usefulness of fluorinated graphite as a column material, the following specific examples are set forth.

EXAMPLE II

Figure 3:
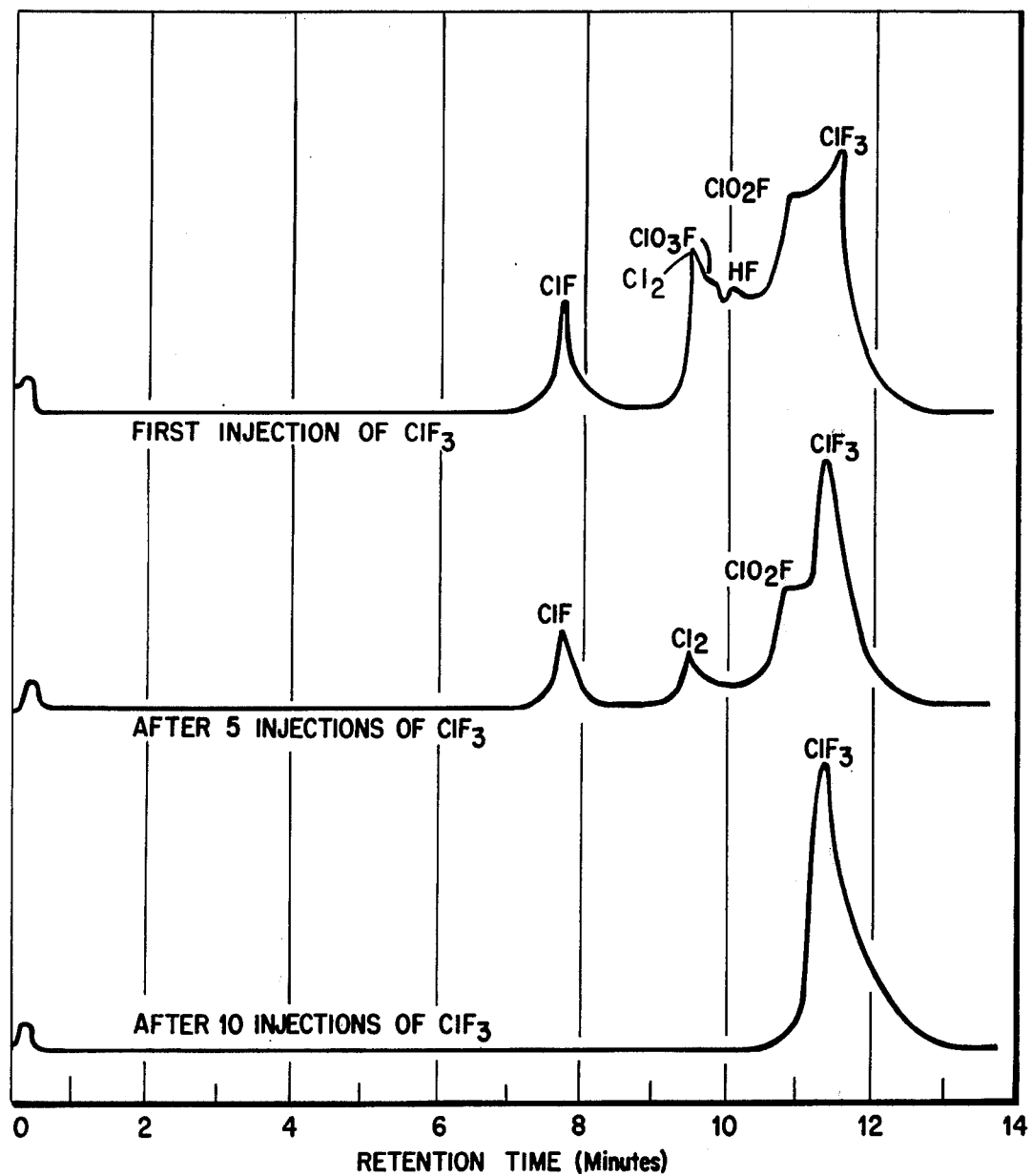
FIG. 3 is a chromatogram produced in accordance with Example II.

A 3.0 meter long, 3.17 mm O.D. nickel column was packed with 80/120 mesh $(CF_x)_N$. To remove trace water buildup and pacify the equipment, the column was conditioned at 100°C by repeated injections of ClF$_3$ at 50 Torr from a 0.73 cc sample loop. After about 10 injections, the chromatogram showed only a ClF$_3$ peak, indicating that the column was ready for use (see FIG. 3).

Figure 4:
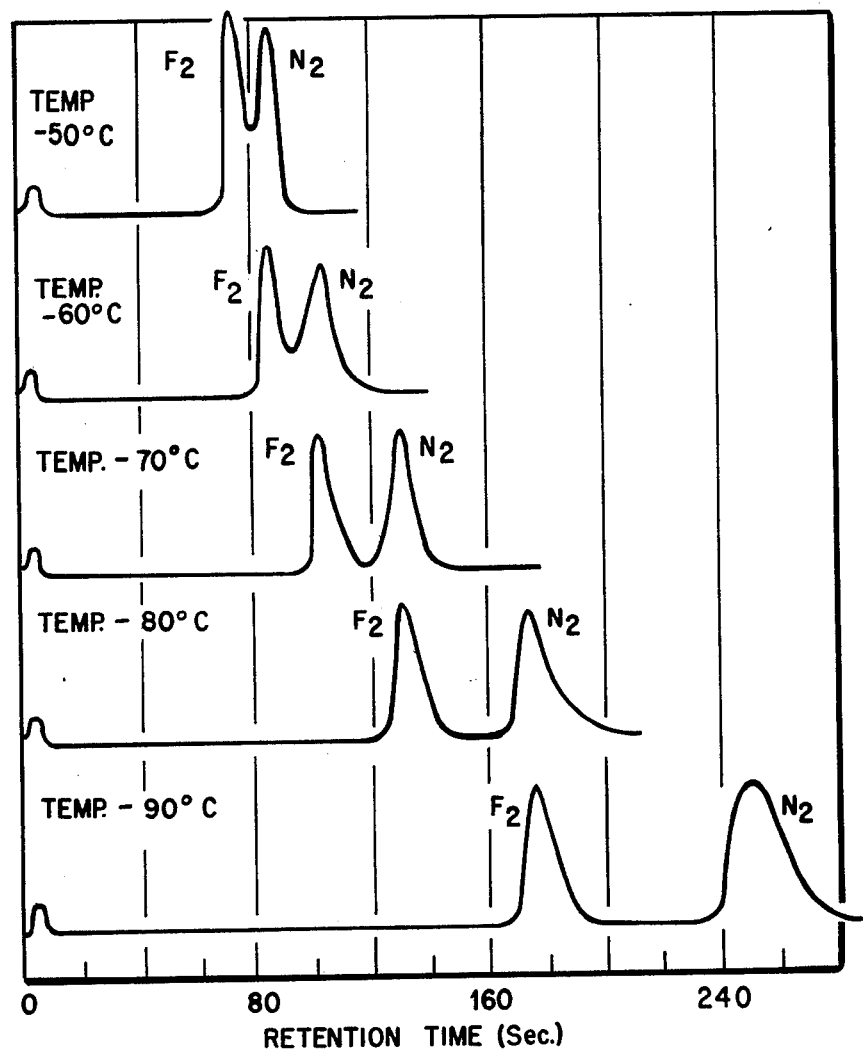
FIG. 4 is a chromatogram produced in accordance with Example II.
Figure 5:
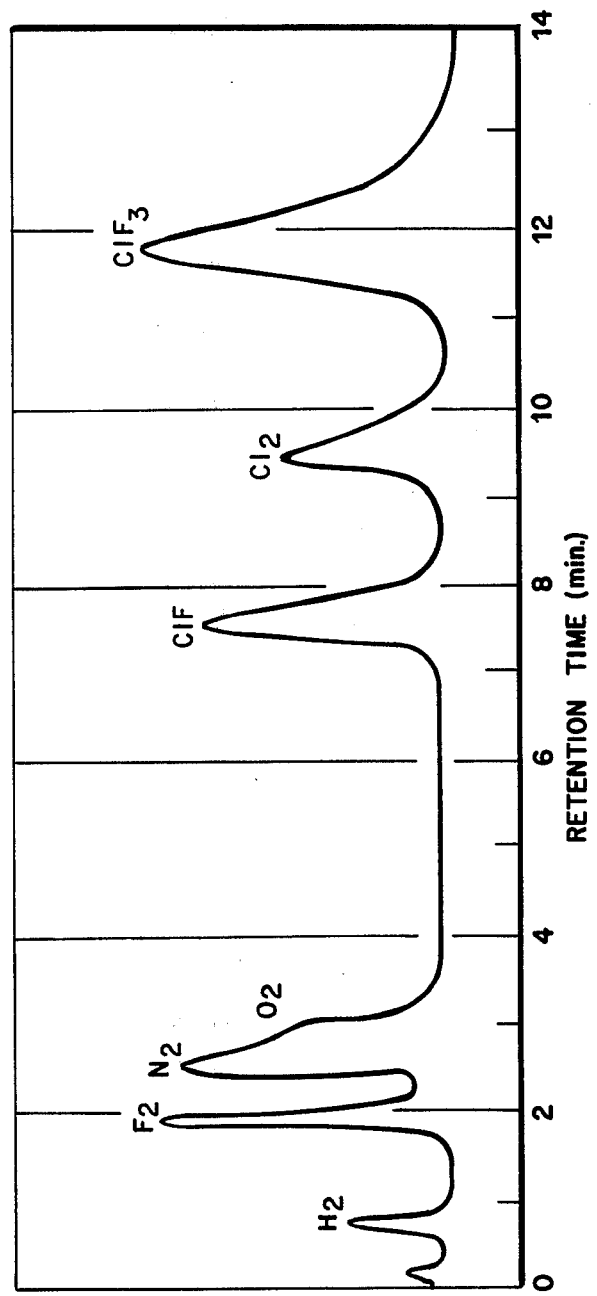
FIG. 5 is a chromatogram produced in accordance with Example III.

Mixtures of 50/50 F$_2$ and N$_2$ were prepared and chromatographed at various cryogenic temperature levels. The results, as shown in FIG. 4, indicate that −70°C gave the best separation of F$_2$ and N$_2$, consistent with maintaining reasonable peak shapes and minimum tailing effects. At this temperature, N$_2$ and O$_2$ can also be separated if the N$_2$/O$_2$ ratio is 1 or less, but at higher ratios the tailing effect of the N$_2$ peak interfered with the O$_2$ peak. In air (N$_2$/O$_2$ = 3.7), the O$_2$ appears as a trailing shoulder on the N$_2$ peak (FIG. 5). The difference in retention times of N$_2$ and O$_2$ was significant enough to determine whether O$_2$ or N$_2$ is absent from the sample.

EXAMPLE III to analyze complex test mixtures containing corrosive fluorides as well as permanent gases using this column, the following temperature program was employed:
1. the column was held at −70°C for 3 minutes (to separate H$_2$, F$_2$, and air).
2. The column temperature was increased at 32°C/minute to 100°C to elute and separate intermediate boiling compounds such as ClF and cl$_2$.
3. The column was held at 100°C for 10 minutes to elute highly retained compounds such as ClF$_3$ and HF.

Very highly retained gases such as HF were eluted when this program was used, but their peaks were so broad that accurate analysis could not be accomplished. A sample chromatogram using the program is shown in FIG. 5, and retention times of several compounds are given below. The retention time of H$_2$ has been included as a reference since it is not retained by the column. Fluorocarbons (e.g., CF$_4$, C$_2$F$_4$Cl$_2$) produce very broad peaks when chromatographed under the conditions noted, indicating a high degree of gas-solid interaction (this occurred for all fluorocarbons, independent of their position in the chromatogram). For this reason, this particular column cannot be effectively used for analysis of these gases.

RETENTION TIMES FOR A 3-METER $(CF_x)_n$ COLUMN

| Compound | Retention Time (seconds) | Compound | Retention Time (seconds) |
| --- | --- | --- | --- |
| H$_2$ | 45 | Cl$_2$ | 555 |
| F$_2$ | 108 | ClO$_3$F | 565 |
| N$_2$ | 145 | HF | 600 |
| O$_2$ | 165 | ClO$_2$F | 645 |
| OF$_2$ | 370 | ClF$_3$ | 675 |
| ClF | 455 | | |

Column: 3.0 meter × 3.175 mm O.D. nickel tube; 80/120 mesh $(CF_x)_n$.
Carrier: Helium at 30 cc/minute.
Temperature Program: −70°C (3 minutes); 32°C/minute heating rate, hold at +100°C (10 minutes).

EXAMPLE IV

As a demonstration of the analytical versatility of this column material, the column was used to analyze Co, CO$_2$, and COF$_2$ in the presence of HF by changing the temperature program. The new program and pertinent retention times are given below. The HF did not have to be analyzed by GC, so no attempt was made to optimize its peak shape, which is too broad to be accurately analyzed. However, the HF eluted at the very end of the program, and did not interfere with the other gases.

RETENTION TIMES FOR A $(CF_x)_n$ COLUMN (CO AND CO$_2$ ANALYSIS)

| Compound | Retention Time (seconds) |
| --- | --- |
| CO | 250 |
| CF$_4$ | 750 |
| CO$_2$ | 870 |
| COF$_2$ | 962 |

Column: 3.0 meter × 3.175 mm O.D. nickel tube; 80/120 mesh $(CF_x)_n$.
Carrier: Helium at 30 cc/minute.
Temperature Program: −85°C (4 minutes); 10°C/minute heating rate; hold at +100°C (5 minutes).

EXAMPLE V

In an effort to reduce the analysis time of Example III, a shorter $(CF_x)_n$ column was packed with large particle size material having a C:F ratio less than 1:0.6. This column and program reduced analysis time by one-third, yet still effected the separation of all components. Retention data for this column are given below.

RETENTION TIMES FOR A 1-METER $(CF_x)_n$ COLUMN

| Compound | Retention Time (seconds) |
| --- | --- |
| F$_2$ | 31 |
| N$_2$ | 43 |
| O$_2$ | 50 |
| ClF | 194 |
| Cl$_2$ | 306 |
| ClF$_3$ | 366 |

Column: 1 meter × 3.175 mm O.D. nickel tube; 60/80 mesh $(CF_x)_n$.
Carrier: Helium at 30 cc/minute.
Temperature Program: −100°C (1 minute); 32°C/minute heating rate; hold at +125°C (5 minutes).

Preliminary results for halocarbon peaks produced using this column indicate that they are much sharper than those obtained using the 3-meter column. This indicates that this column can be used for the analysis of these types of compounds also.

While this invention has been described basically with relation to gas-solid chromatography, fluorinated graphite may also be used as a support in gas-liquid chromatography. Fluorinated graphite may be coated with a low-molecular-weight polymer of chlorotrifluoroethylene or any of the other fluorocarbon oils for such GLC applications.

What is claimed is:
1. In an apparatus for carrying out gas chromatography comprising a packed column, means for feeding a mixture of gases into said column, and means for detecting the flow of gases out of said column; the improvement comprising fluorinated graphite as the col- umn packing material, said fluorinated graphite being $(CF_x)_n$ where $0.5 < x < 1.14$ and $n$ is an integer.

2. the improvement according to claim 1 further including a fluorocarbon oil coating on said fluorinating graphite for use in gas-liquid chromatography.

3. the improvement according to claim 2 wherein said fluorocarbon oil is chlorotrifluoroethylene.

4. The improvement according to claim 1 wherein said fluorinated graphite has a graphite crystal structure and a surface area greater than 130 square meters per gram.

5. In a method of separating gas mixtures wherein said mixtures are passed through a packed column to achieve separation; the improvement comprising packing said column with fluorinated graphite, said fluorinated graphite being $(CFx)_n$ where $0.5 < x < 1.14$ and $n$ is an integer.

6. The improvement according to claim 5 wherein said fluorinated graphite has a graphite crystal structure and a surface area greater than 130 square meters per gram.

7. The improvement according to claim 5 wherein said fluorinated graphite is $(CF_{0.6})_n$.

8. the improvement according to claim 5 wherein said mixtures contain a member selected from the group consisting of halogens, halides, and halocarbons.

* * * * *